Sept. 30, 1941.        P. JEPSON        2,257,341
FRUIT TREATING MACHINE
Filed June 14, 1938        14 Sheets-Sheet 1

INVENTOR.
Percy Jepson
BY Lyon & Lyon
ATTORNEYS

Sept. 30, 1941.    P. JEPSON    2,257,341
FRUIT TREATING MACHINE
Filed June 14, 1938    14 Sheets-Sheet 2

INVENTOR.
Percy Jepson
BY Lyon & Lyon
ATTORNEYS

Sept. 30, 1941.   P. JEPSON   2,257,341
FRUIT TREATING MACHINE
Filed June 14, 1938   14 Sheets-Sheet 7

INVENTOR.
Percy Jepson
BY
Lyon & Lyon
ATTORNEYS

Sept. 30, 1941.   P. JEPSON   2,257,341
FRUIT TREATING MACHINE
Filed June 14, 1938    14 Sheets-Sheet 8
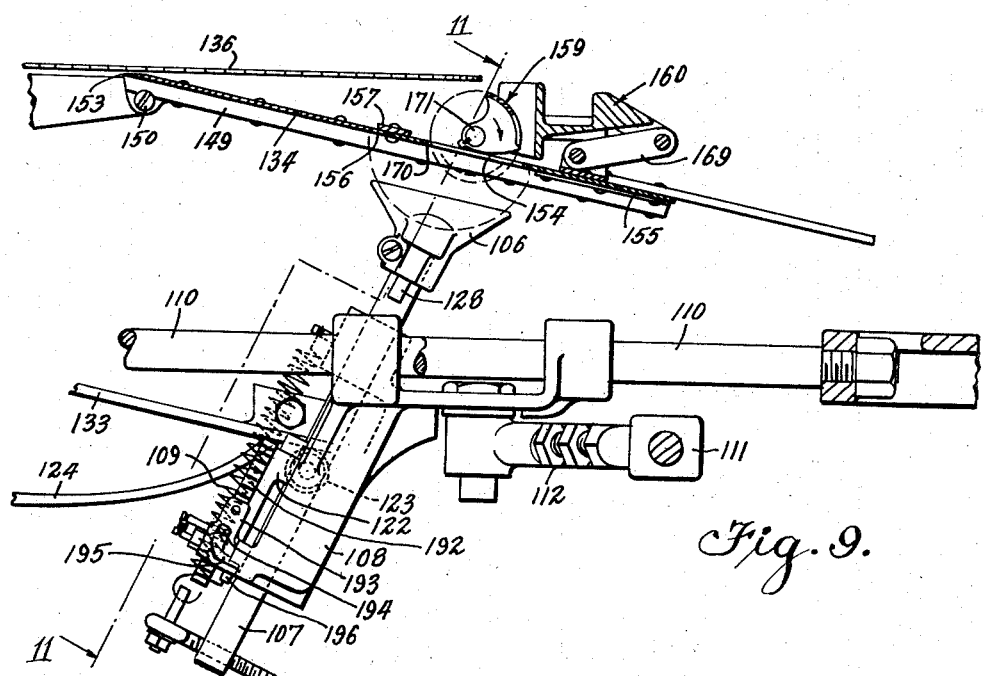
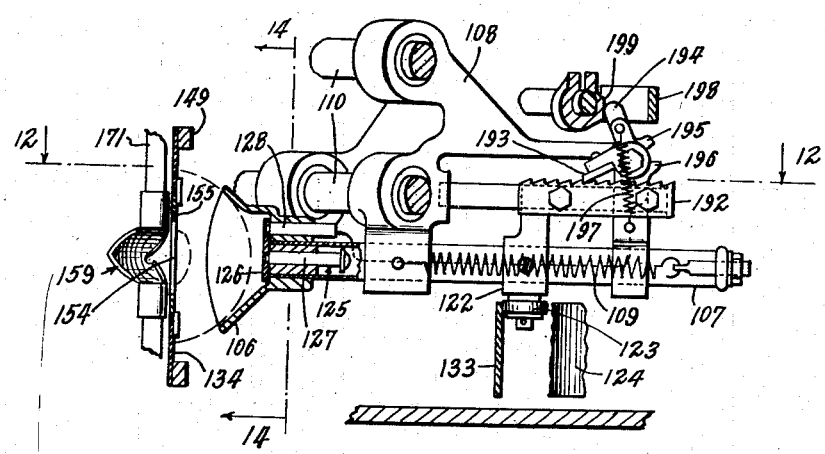
INVENTOR.
Percy Jepson
BY Lyon & Lyon
ATTORNEYS Inventor
Percy Jepson
By Lyon & Lyon
Attorneys Sept. 30, 1941.　　　P. JEPSON　　　2,257,341
FRUIT TREATING MACHINE
Filed June 14, 1938　　14 Sheets-Sheet 10

INVENTOR.
Percy Jepson
BY
Lyon & Lyon
ATTORNEYS

Sept. 30, 1941.    P. JEPSON    2,257,341
FRUIT TREATING MACHINE
Filed June 14, 1938    14 Sheets-Sheet 11
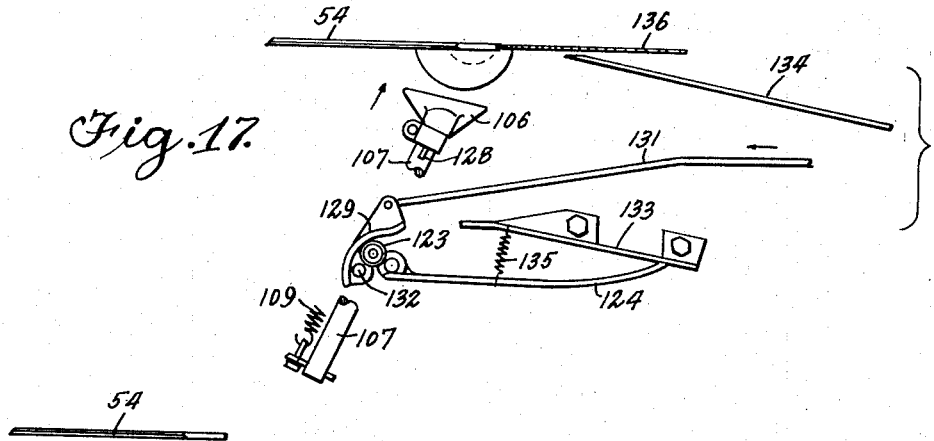
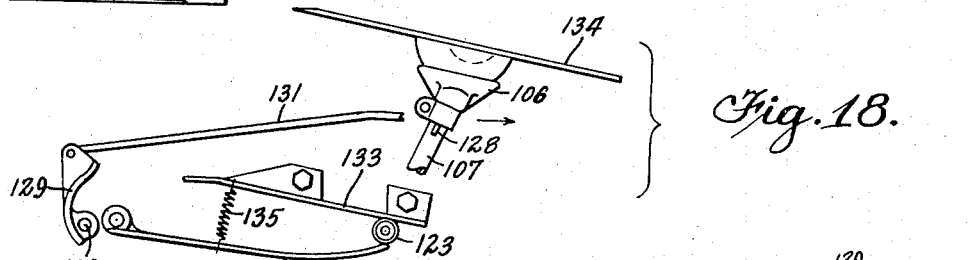
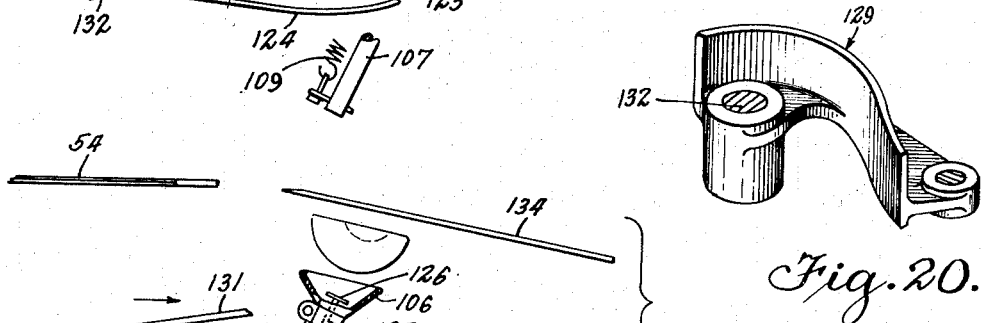
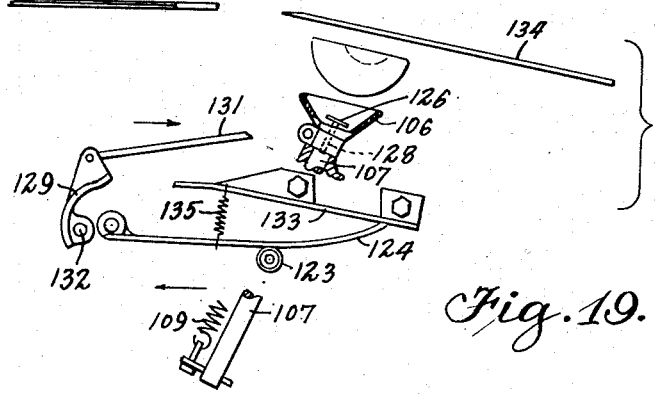
INVENTOR.
Percy Jepson
BY Lyon & Lyon
ATTORNEYS Sept. 30, 1941.   P. JEPSON   2,257,341
FRUIT TREATING MACHINE
Filed June 14, 1938   14 Sheets—Sheet 12
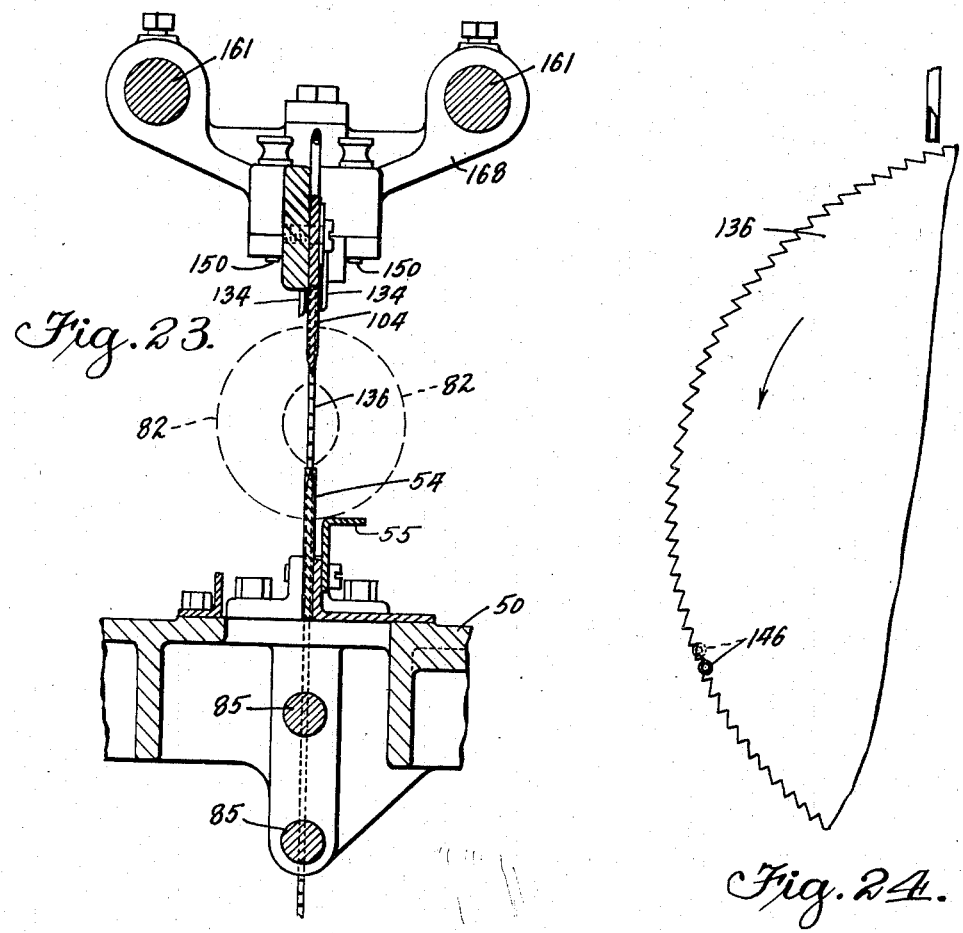
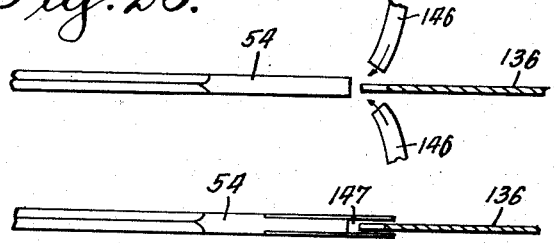
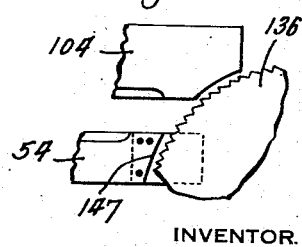
INVENTOR.
Percy Jepson
BY
Lyon & Lyon ATTORNEYS

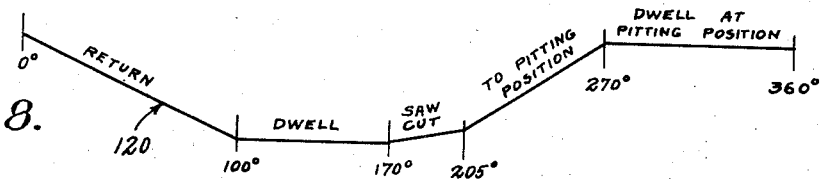
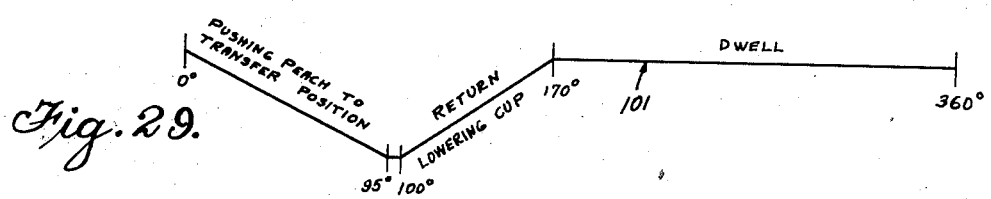
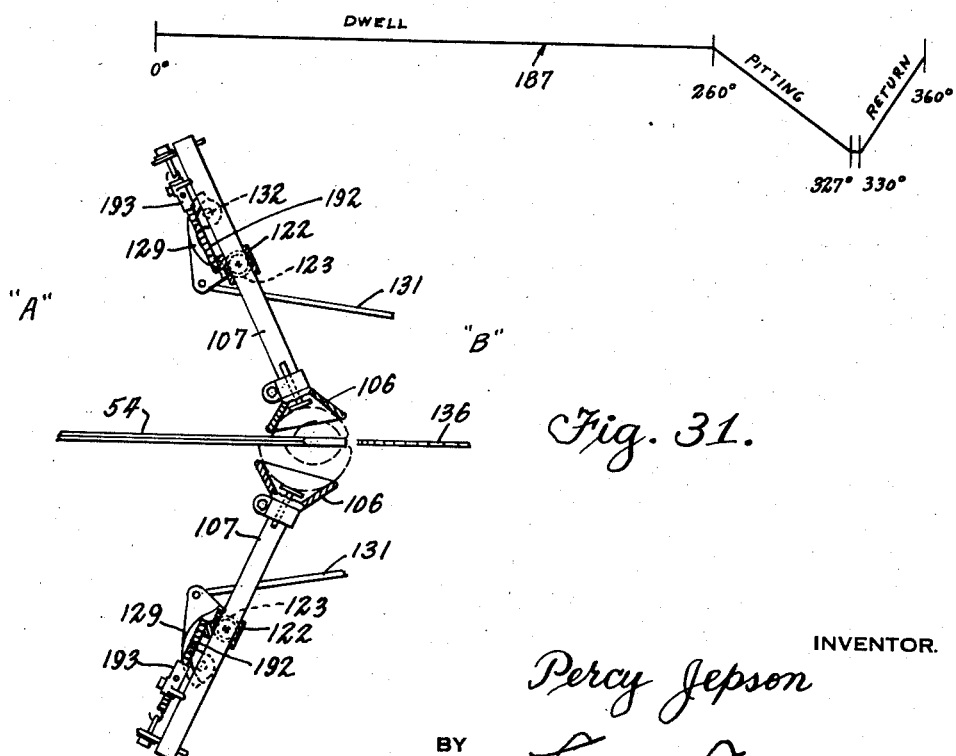

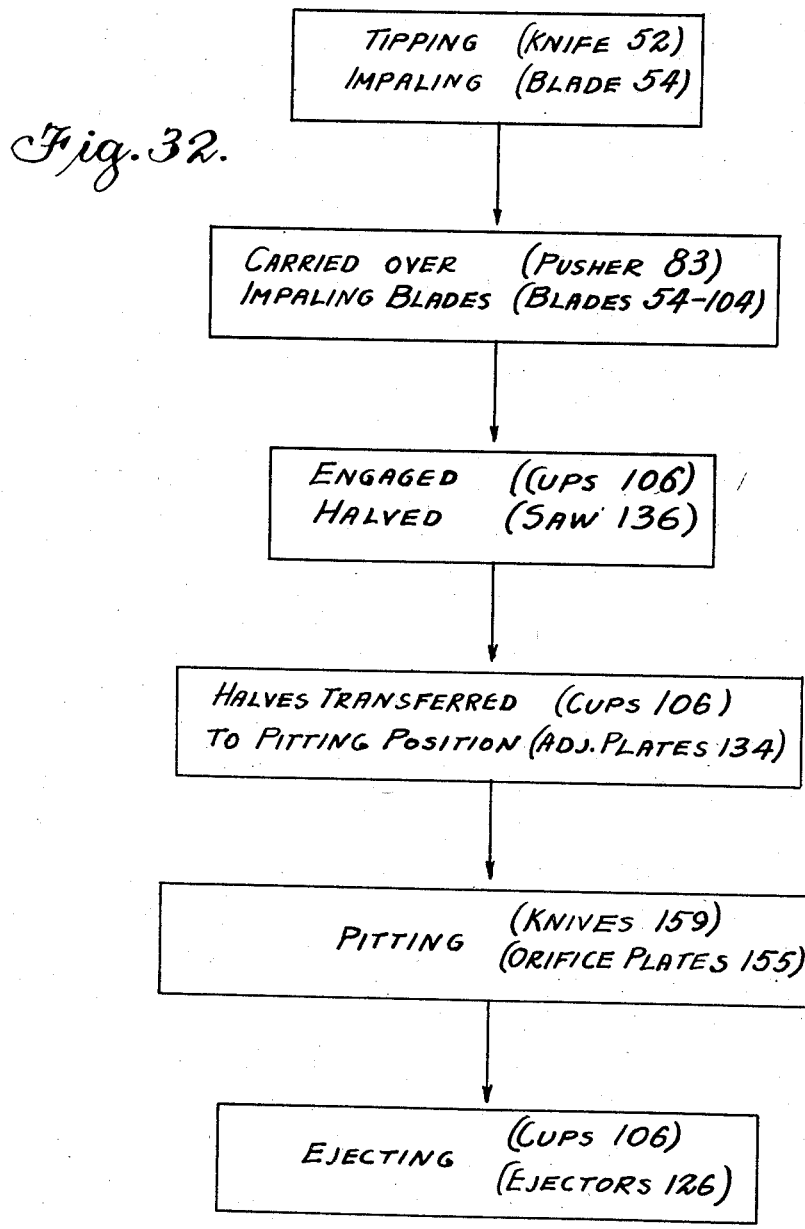

Patented Sept. 30, 1941

2,257,341

UNITED STATES PATENT OFFICE 2,257,341

FRUIT TREATING MACHINE

Percy Jepson, San Francisco, Calif., assignor to Pacific Machinery Company, San Francisco, Calif., a corporation of California Application June 14, 1938, Serial No. 213,604

15 Claims. (Cl. 146—28)

This invention relates to a fruit treating machine and in its preferred embodiment is especially adapted to the bisecting and pitting of peaches. The machine of this invention may be adapted to the bisecting and removing of pits from fruits other than peaches as will be readily appreciated by those skilled in this art.

For the purpose of this application the peach treating embodiment of the invention has been chosen for the purpose of illustration and description.

A successful pitting machine must consistently produce a high quality of work, that is, the fruit treated must be cleanly and accurately cut into halves and the pit cleanly and accurately removed therefrom without damaging the meat of the fruit; the machine must maintain its quality of operation even when operating at a relatively high rate of speed; the fruit must be pitted with certainty and accuracy even though it varies greatly in shape, size or variety; for example, the machine must handle with nearly equal dispatch free end clingstone peaches and especially the split pit peaches which during some seasons constitute a relatively large percentage of the clingstone variety; and, among other things, the machine must be easily operated and require the least possible effort on the part of the operator whereby rapid feeding of the machine may be maintained over extended periods of time without causing the operator undue physical strain.

One of the principal objects of this invention is to provide a fruit treating machine which will fulfill the above set forth specifications.

During the past season many tons of peaches have been treated in machines of this invention and have fully demonstrated their ability to meet these and other objects of the invention.

Other objects of this invention are to provide a fruit treating machine which will perform the pitting operation with the least possible "pitting loss," that is, the loss of edible meat cut from the fruit during the pitting operation; to provide means for positioning the bisected fruit in substantially correct pitting register whether the fruit is of relatively large or small size; to provide a floating pitting plate to accommodate such different size fruits and in providing the pitting plate with a movable orifice blade arranged to form a shearing edge for the pitting knife; and providing means for connecting the orifice blade with the pitting knife supporting means whereby the shearing relation between the pitting knife and orifice blade will be maintained for the different adjustments of the floating plate whereby the pits will be cleanly cut from different sizes of fruit without tearing of the meat of the fruit during the final portion of the pitting operation; to provide means for mounting the pitting knives for permitting bodily movement with relation to their respective pitting plates, whereby elongated pits may be cut from the fruit without making proportionately deep cuts in the fruit meat; and to provide an independent mounting for each of the pitting knives whereby one of said knives may operate to make a longer cut through its respective fruit half than the other, in such cases where one of the fruit halves contain a greater portion of the halved pit than the other; to provide means for yieldingly resisting the bodily movement of each of said pitting knives; to provide a driving means for the pitting knives including an independent yielding means for each knife whereby should one of the pitting knives hang up during the pitting operation, such knife will not be broken and whereby the other of said knives may be driven through its pitting operation independently of the failure of the other of said knives to complete its pitting operation; and to provide each of the pitting knives with yieldable means for resisting the bodily movement thereof during the pitting operation whereby the knives will closely follow the contour of the pit.

A further object is to provide an impaling blade for supporting the fruit and a fruit engaging means movable along an axis angularly relating to the plane of said blade for positioning a selected portion of each piece of fruit whether relatively large or small at the same predetermined location in the machine.

Other objects and advantages of the invention will become apparent as the nature of the same is more fully understood from the following description and accompanying drawings wherein is set forth what is now considered to be a preferred embodiment. It should be understood, however, that this particular embodiment of the invention is chosen principally for the purpose of exemplification, and that variations therefrom in details of construction or arrangement of parts may accordingly be effected and yet remain within the spirit and scope of the invention as the same is set forth in the appended claims.

In the drawings:

Figure 9 illustrates on enlarged scale an elevational view of the right hand cup carrier, a portion of the latch cam and the pitting means in section.

Figure 11 illustrates a view taken substantially in the plane of line 11—11 of Figure 9.

Figures 17 through 19 show diagrammatically the cup carrier and its controlling cam in different positions during an operating cycle.

Figure 20 illustrates in perspective the cup carrier cam gate.

Figure 21 is a perspective view of the tipping knife.

Figure 22 is a perspective view of the pitting knife.

Figure 23 illustrates an enlarged sectional view taken substantially in the plane of line 23—23 of Figure 3.

Figure 24 illustrates a fragmental view of the splitting saw and the location of the water jets for washing the sawdust and other foreign material from the saw.

Figure 25 is a fragmental view to show the relation between the fruit impaling blade and the bisecting saw and the water jets.

Figure 26 illustrates a modified form of the fruit impaling blade and the relation of the bisecting saw thereto.

Figure 27 is an elevational view of Figure 26.

Figures 28, 29, and 30 diagrammatically illustrate the timing of the cams for operating the different mechanisms of the machine.

And Figure 31 illustrates diagrammatically the manner in which large and small fruit halves are correctly positioned in the machine by the angular arrangement of the fruit engaging means to the fruit supporting blades.

Figure 32 is a flow-sheet illustrating diagrammatically the sequence of operations performed with my fruit treating machine.

Figure 1:
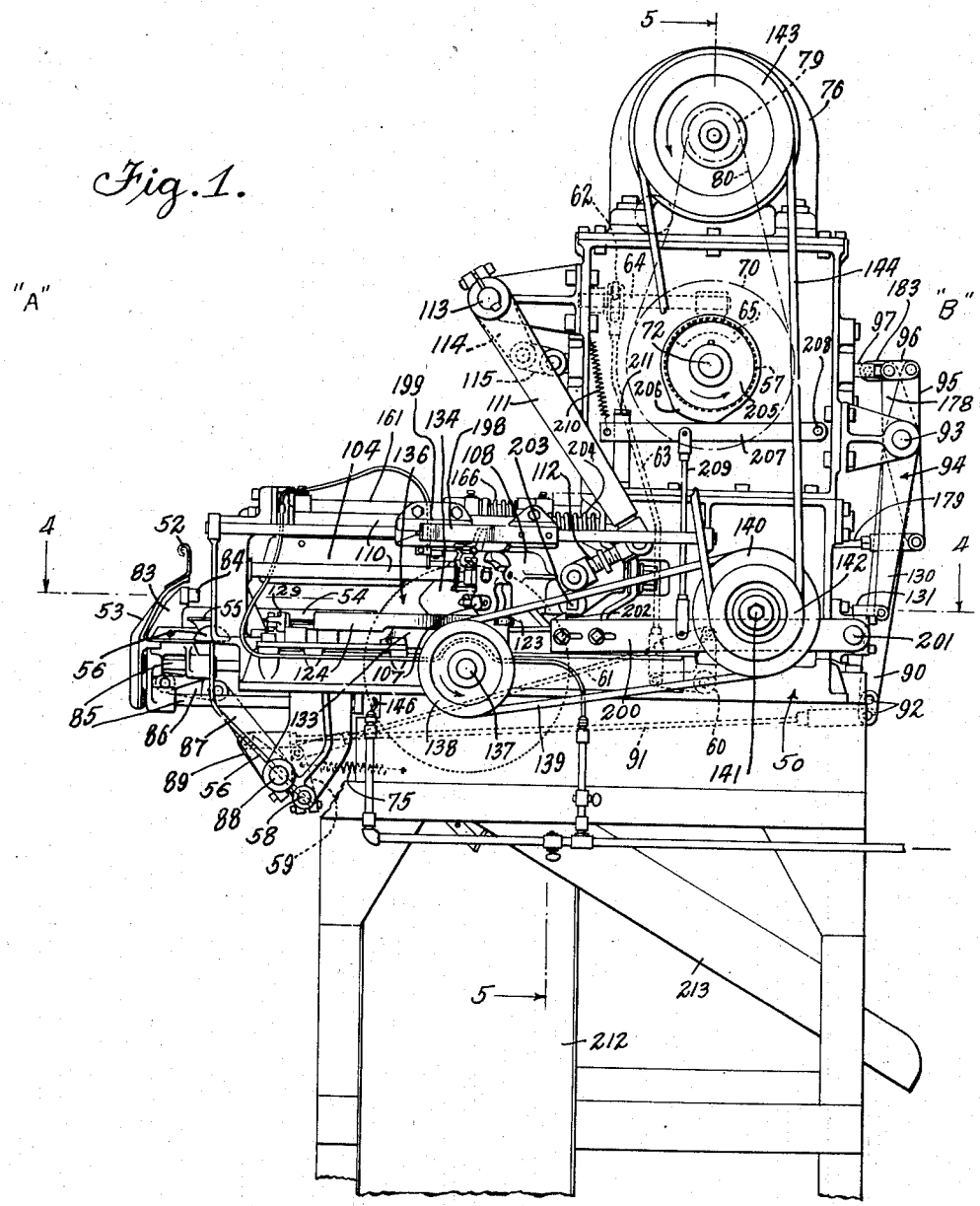
Figure 1 illustrates an elevational view of the right hand side of the machine, as it would appear during the pitting operation.
Figure 3:
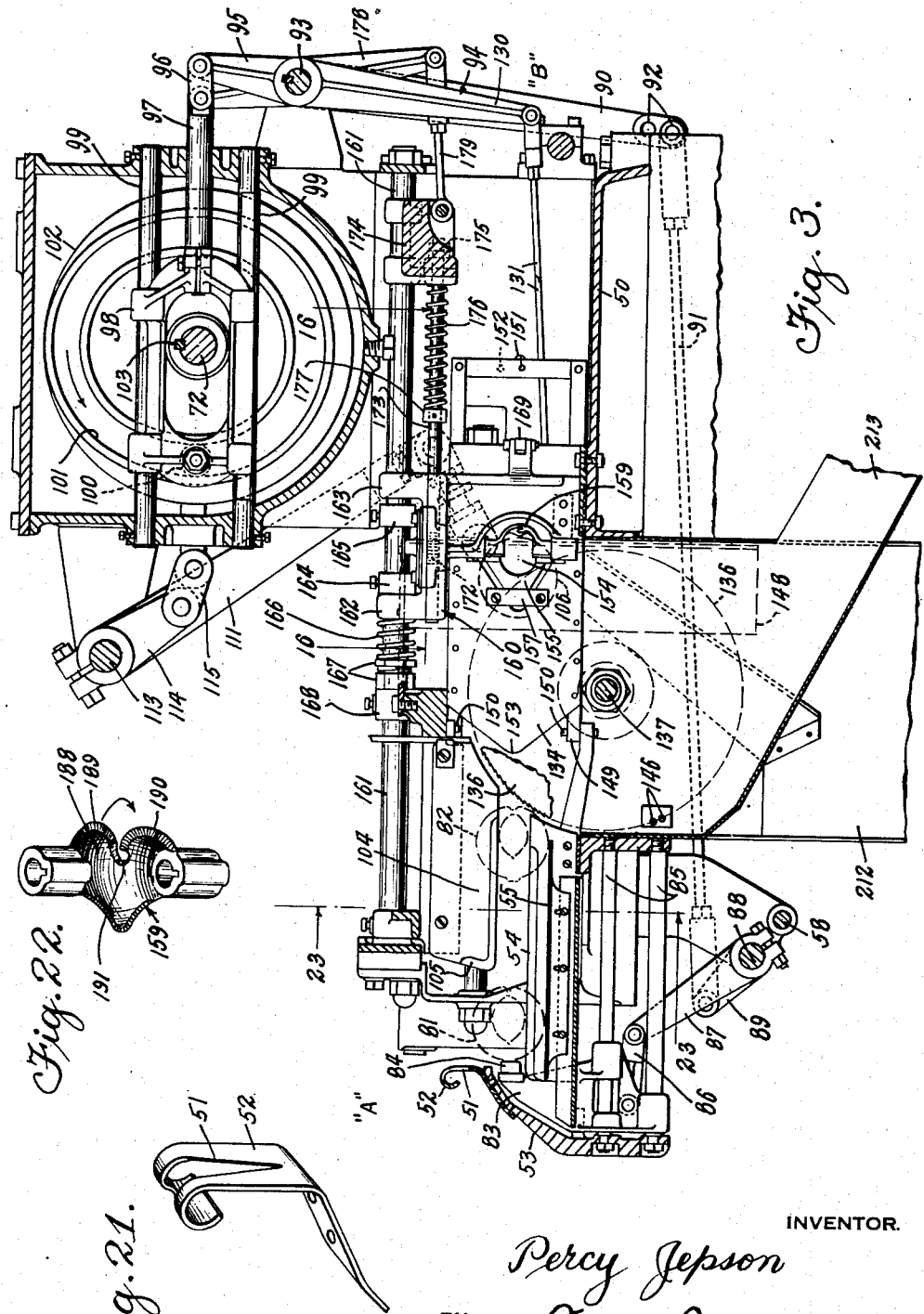
Figure 3 illustrates on an enlarged scale a fragmental longitudinal sectional view taken substantially in the plane of line 3—3 of Figure 2.
Figure 4:
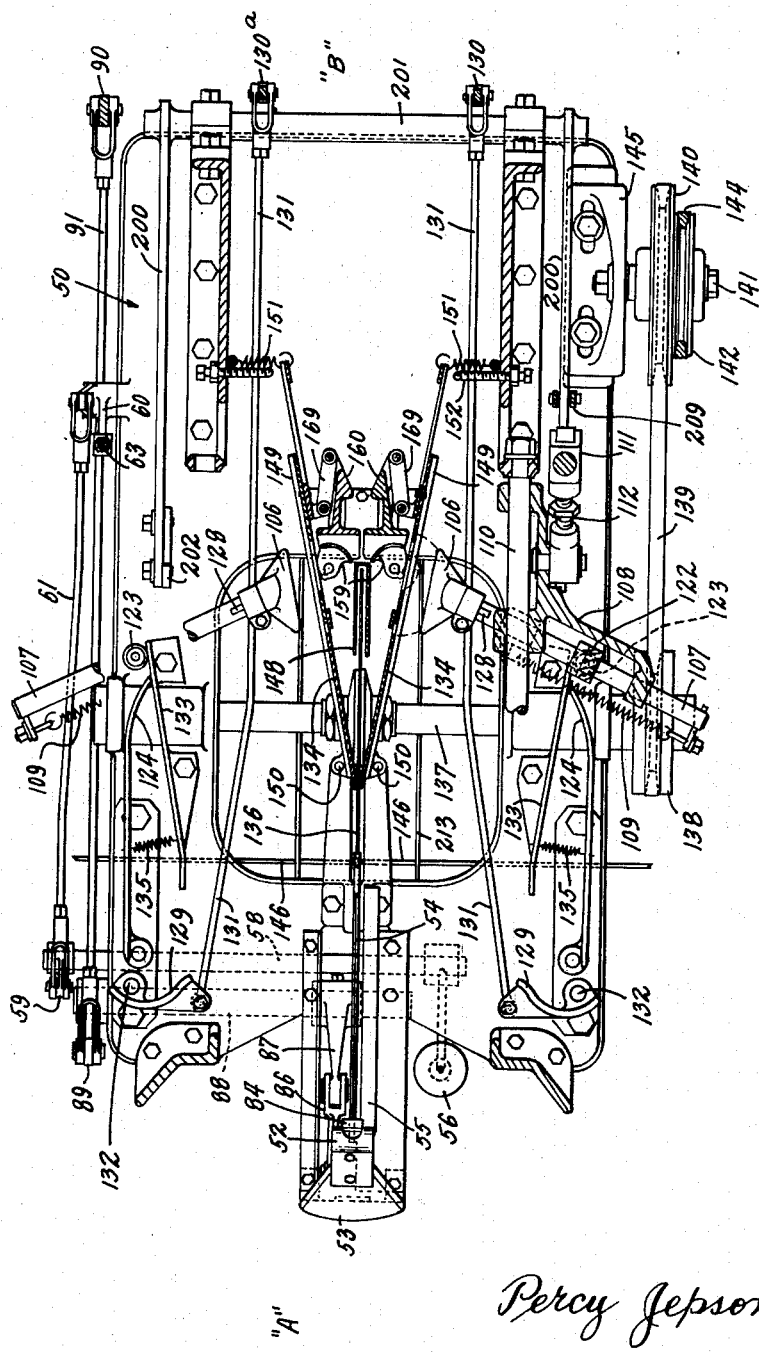
Figure 4 illustrates on enlarged scale a sectional view taken substantially in the plane of line 4—4 of Figure 1.

In the preferred embodiment of the invention, the machine is provided with a frame 50 of suitable construction for supporting the operating mechanisms of the machine. The forward end of the machine at which the operator stands while feeding peaches thereto is indicated in Figs. 1, 3, and 4 by the letter A, while the rear end of the machine is indicated in these same figures by the letter B. The machine is preferably mounted at a suitable height for the operator to sit on a stool (not shown) and to feed peaches to the machine from a box or other suitable supply. In operating the machine, the operator will select a peach from the supply and in feeding the peach to the machine will pass the tip thereof into the V-shaped notch 51 of the tip removing knife 52, note especially Figure 21. In this way, the tip of the peach will be removed as the fruit is fed into the machine and this tipping operation also assists in properly alining the fruit. The tipping blade 52 is mounted on the upper end of a suitable frame bracket 53, (Fig. 3) and the V-shaped notch 51 of this knife is mounted directly above the impaling and supporting blade 54 whereby as the fruit is conveyed by the operator downwardly across the tipping knife 52, the fruit will be in alinement with the impaling blade 54. The blade 54 is sharpened along its edge to enable the fruit to be easily impaled thereon. The fruit is impaled upon blade 54 in the plane of its suture until the pit engages the upper edge of the blade and with the tip end of the fruit directed forwardly and thereby positioning the stem end direclty toward the rear of the machine as indicated in broken lines in Fig. 3. This arrangement of the tipping and impaling blades enables fruit to be rapidly and accurately impaled upon blade 54 with easy, direct and natural movements on the part of the operator. The impaling blade 54 extends rearwardly from directly below the tipping knife to adjacent means for bisecting the fruit. The impaling blade is mounted in the frame in any suitable manner. A split pit guard 55 is mounted along the impaling blade and is spaced at a selected distance from the upper edge of the blade and serves to correctly position peaches upon the impaling blade having split pits which otherwise might pass completely across the knife during the impaling operation splitting the fruit into halves, due to the split condition of the pit, as the pit would not in most cases engage the upper edge of the impaling blade to locate the fruit. The split pit guard 55 is adjustably mounted upon one or both sides of the impaling blade in any suitable and convenient manner. In Figure 23 the relation of the split pit guard 55 and impaling blade 54 is clearly shown.

Having impaled the fruit in the machine, the operator need only actuate clutch lever 56 to place the machine in operation, no other attention is required on the part of the operator as from this point on the operation of the machine is entirely automatic and thus the attention of the operator may be concentrated entirely upon correctly feeding the fruit into the machine.

In the actual operation of this machine, it has been found that an operator with very little experience can feed from 38 to 40 peaches per minute and this rate of feed may be increased as the operator becomes more skillful.

Figure 2:
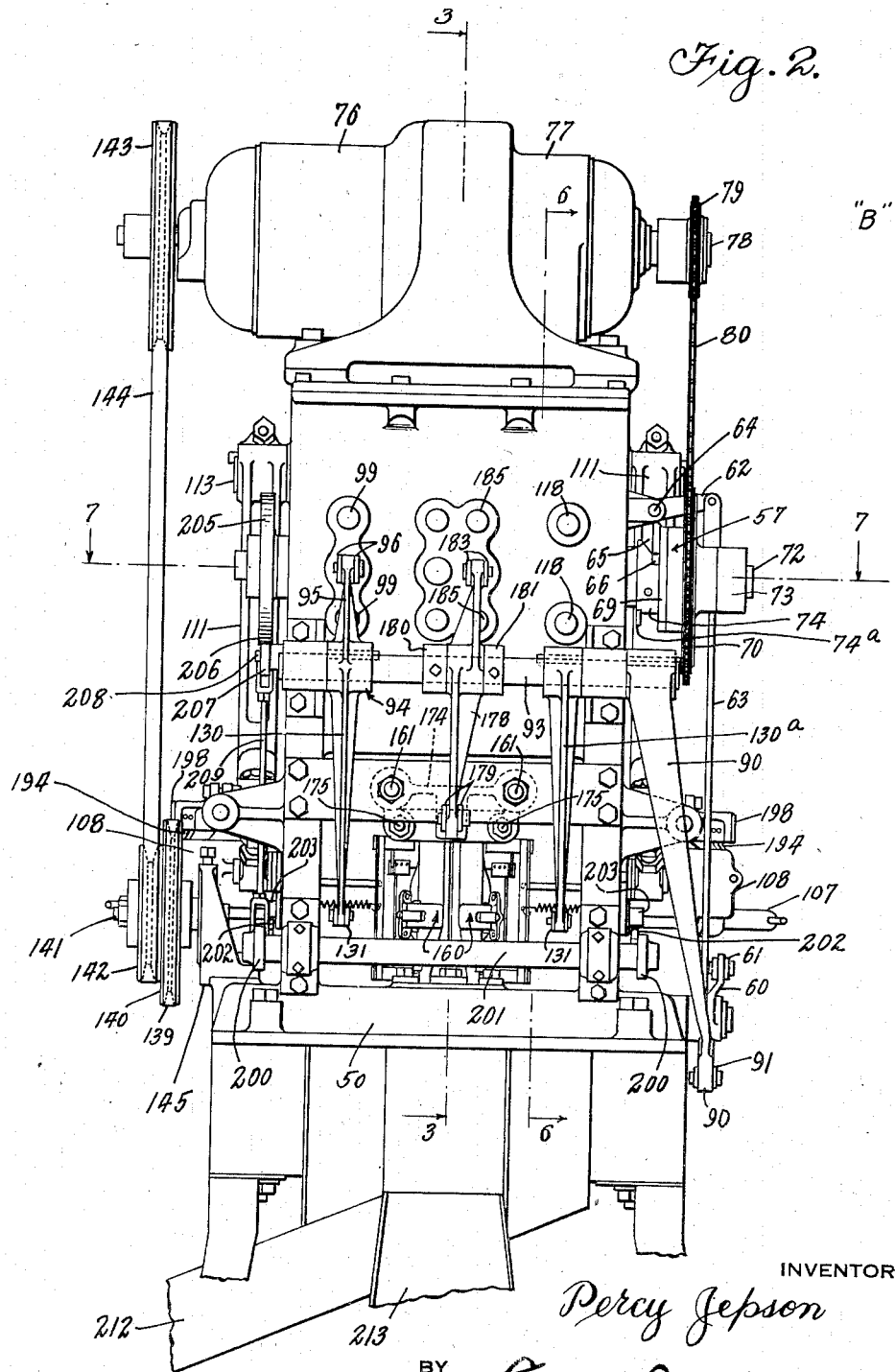
Figure 2 illustrates a rear end view of Figure 1.
Figure 7:
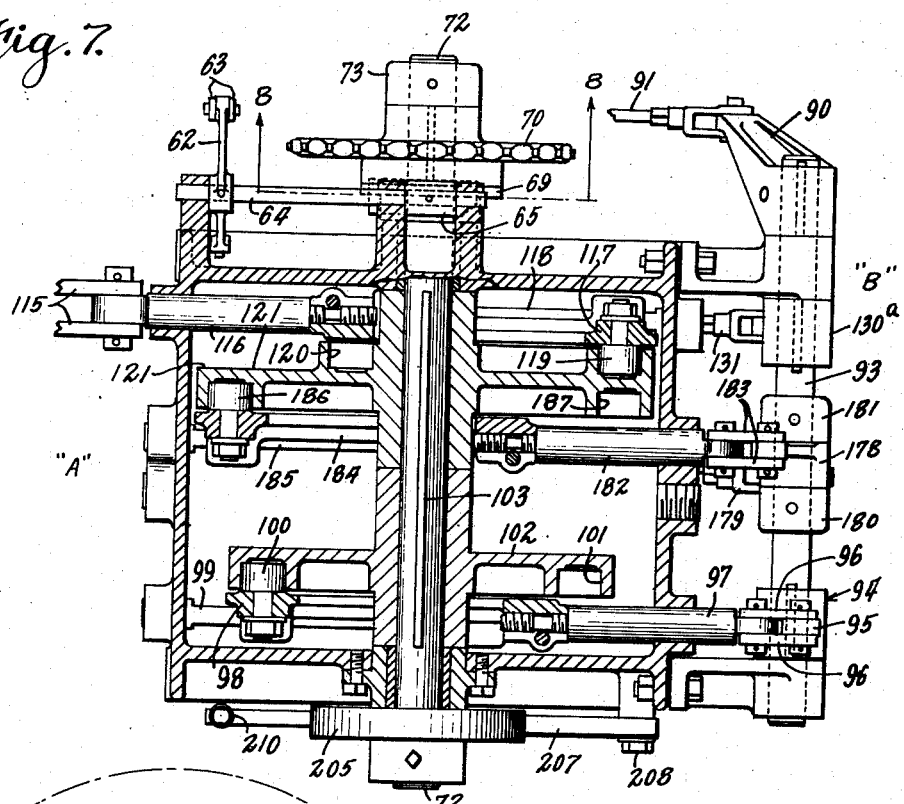
Figure 7 illustrates a sectional view taken substantially in the plane of line 7—7 of Figure 2.
Figure 8:
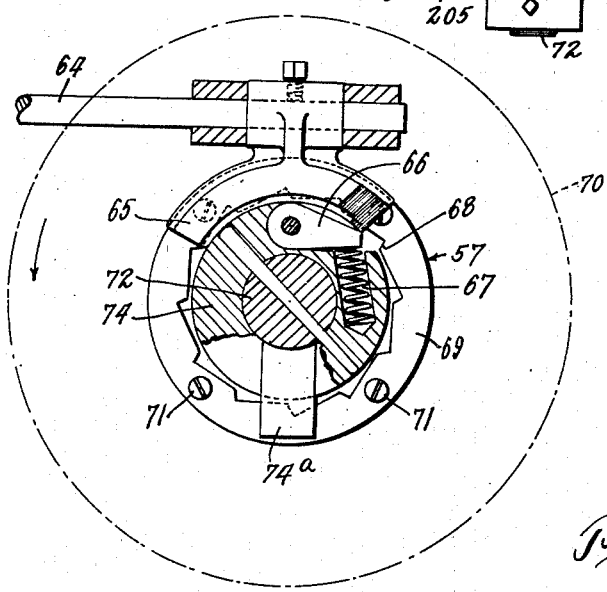
Figure 8 illustrates a sectional view taken substantially in the plane of line 8—8 of Figure 7.

The operator in pressing the lever 56 which operates with a relatively light touch releases the driving clutch 57 (Fig. 8) through the following train of mechanisms:

The lever 56 is secured upon cross shaft 58 (Figs. 1, 3, and 4) journaled transversely in the machine frame and having secured to its opposite end a lever 59, the free end of which is connected to one arm or a bell crank lever 60 (Figs. 1 and 4) by means of a suitable link 61 (Figs. 1 and 4). The second arm of bell crank lever 60 is connected to the free end of lever 62 (Figs. 1, 2, and 7) by means of link 63 (Figs. 1 and 2), the lever 62 is secured to the outer end of the clutch tripping shaft 64 and a clutch tripping plate 65 is secured to the shaft 64 and is normally maintained in position to hold the clutch driving pawl 66 in retracted position as illustrated in Fig. 8. When the operator actuates the clutch lever 56, the motion will be transmitted through the mechanism described to swing the tripping plate 65 to release the clutch driving pawl 66 whereupon under the influence of its spring 67, the free end of the pawl will swing into position to be engaged by one of the driving notches 68 formed in a driving ring 69. The notched driving ring 69 is secured to the hub of sprocket 70 (Figs. 2 and 5) by screws 71 or other suitable means. The sprocket is journaled upon a transverse cam shaft 72 and is held in position thereon by collar 73 and the driven member 74 of the clutch, both of which are securely fastened to the cam shaft. The clutch driving pawl 66 is pivotally mounted upon the driven member 74. A spring 75 (Fig. 1) normally holds the clutch lever 56 and the clutch tripping plate 65 through the connecting mechanism in clutch disengaging position and acts as soon as the operator releases the lever 56 to swing the clutch tripping plate 65 in position to disengage the clutch at the end of the operating cycle. The driven member 74 may be provided with a cam plate 74a (Figs. 5 and 7) which will act during the rotation of member 74 to positively return the clutch tripping plate 65 to its clutch disengaging position, however, in some cases, the cam 74a may be dispensed with so that the machine may be continuously operated.

In the operation of the machine, the operator need but instantaneously actuate the clutch lever 56 whereupon the machine will be put into operation and will automatically stop at the completion of the pitting cycle. Upon impaling a second piece of fruit in the machine, the clutch may be again released and the machine operated through a second operating cycle and so on for the succeeding pitting operations. If the cam plate 74a is dispensed with, the clutch lever 56 may be held depressed, thereby causing the machine to run continuously, and, in some cases, it is more convenient to so operate the machine, in which case the operator will feed a piece of fruit into the machine in time with each operating cycle thereof, however, in the preferred embodiment of the machine it is deemed desirable for the operator to trip the machine into operation with the feeding of each piece of fruit therein.

Any suitable form of motive power may be utilized in driving the machine. In this embodiment however, an electric motor 76 (Figs. 1 and 2) is mounted upon the upper portion of the machine and is provided with a speed gear reducing mechanism 77 forming a unit with the motor and having a shaft 78 extending from one end thereof upon which is suitably secured a driving sprocket 79 which is connected to the clutch spocket 70 by means of a driving chain 80. It will be understood that during the operation of the machine the motor 76 will be continuously in operation and will continuously drive the clutch sprocket 70, whereby upon release of the clutch the machine will be instantaneously placed in operation in the manner described.

With each operation of the machine, the cam shaft 72 will be driven through 360 degrees, one revolution or, in other words, one cycle of operation and as this shaft carries a series of operating cams for driving the several elements of the machine the said elements will likewise be driven or actuated through one cycle of operation for each release of the clutch. The operator having fed a piece of fruit indicated at 81 in broken lines in Fig. 3 on the impaling blade 54 and having released the driving clutch, the machine will first operate to push the impaled piece of fruit along the impaling blade to a transfer position as indicated by broken lines at 82 in Fig. 3. The fruit will be pushed along the impaling blade by a pusher element 83 (Figs. 1 and 3) provided at its upper end with an offset button like portion 84 lying directly over the upper edge of the impaling blade 54 for engaging the blossom end of the fruit approximately centrally thereof. The tip of the fruit having been removed during the feeding operation provides a flattened surface against which the portion 84 of the pusher can act.

The pusher element 83 is mounted for reciprocation upon a pair of spaced guide rods 85 (Fig. 3). The reciprocating mechanism for the pusher element includes connecting this element by means of link 86 to the free end of lever 87 secured upon the transverse shaft 88. The transverse shaft is suitably journaled in the frame of the machine and has secured to its outer end a lever 89 connected at its free end to the free end of lever 90 by means of link 91. The free end of lever 90 is provided with two spaced pin holes 92 to either of which the link 91 may be connected, thereby providing an adjustment for the pusher member. The cam lever 90 is keyed to the outer end of lever shaft 93. The shaft 93 is suitably journaled in the frame of the machine and has keyed thereon a double ended lever 94, the upper end 95 of this lever is connected by links 96 to one end of plunger rod 97. Adjustably connected to the opposite end of plunger 97 is a cross head 98 mounted for reciprocation upon spaced guide rods 99. The cross head 98 is provided with a cam roller 100 arranged to travel in cam groove 101 formed in the adjacent side face of cam disc 102. The cam disc 102 is one of the main operating cam discs which is keyed upon cam shaft 72 by the elongated key 103. The cam groove 101 is shaped to reciprocate the pusher element to advance the impaled peach from its feeding to its transfer position. The profile of cam groove 101 is diagrammatically represented in Fig. 29 showing the actuation of the pusher for advancing the peach during the first 95 degrees of rotation of the cam, to dwell there 5 degrees and thereafter to return to its initial position during the rotation of the cam to 170 degrees and to maintain the pusher in retracted position for the remainder of the operating cycle, thereby providing ample time for the operator to feed the next piece of fruit into the machine. As the cam groove controls both in and out strokes of the pusher mechanism, the operation thereof is smooth, quiet, and rapid. It is desirable although not entirely necessary to provide a second impaling blade 104 (Fig. 3) directly above the impaling blade 54 and spaced therefrom a distance sufficient to accommodate large size pits to travel between the two impaling blades. The spacing between the blades may be adjusted in any suitable manner. The second impaling blade 104 does not extend for the full length of the lower impaling blade 54, in order to provide room for the feeding of the fruit into the machine. By this arrangement of the two blades, the operator need only impale the fruit upon the first of said blades while the machine will act to impale the fruit upon the second.

As the two blades are in alinement, they help the operator to correctly aline the plane of the suture of the fruit with the plane of the impaling blades. The upper impaling blade 104 is sharpened along its front engaging edge as indicated at 105. The split pit guard 55 as will be noted in Figure 3, extends for nearly the full length of the impaling blade 54 and will act to guide peaches having split pits during the movement of such fruit from the feeding to the transfer station.

During the operating period of the machine in which the pusher is advancing the impaled fruit along the impaling blades, the fruit carrying cups are advanced from the pitting station to the transfer station. This is indicated by the first portion of the cup carrier actuating cam diagram as shown in Fig. 28. There are two fruit carrying cups, one for engaging each side of the impaled friut at the transfer station and operable for advancing the fruit through the bisecting means and into pitting register at the pitting station. As each of the fruit carrying cups and its actuating mechanism is like the other, the description will be confined to one.

The fruit carrying cup 106 includes a cup shaped portion for cupping around the body of the fruit as is clearly shown in Figure 11, whereby during the travel of the cup carrier the fruit will be conveyed from one station to the next. The fruit carrying cup 106 is mounted upon one end of plunger 107 (Figs. 4, 9, and 11) slidably mounted in the carriage 108. The plunger 107 is yieldingly urged by spring means 109 to in turn press the fruit cup in holding relation with the fruit. The carriage 108 which slidably supports plunger 107 is mounted for reciprocation upon a pair of guide rods 110 and is reciprocated back and forth along these rods by the following mechanism which includes connecting the carriage to the free end of cam lever 111 by means of link 112. The cam lever is keyed to a transverse shaft 113 which shaft is suitably journaled in the frame of the machine. Keyed to shaft 113 is a short lever 114 which is connected at its free end by means of link 115 to the forward end of plunger 116. The rear end of plunger 116 is connected to cross head 117 mounted for reciprocation upon a pair of guide rods 118. The cross head is provided with a cam roller 119 arranged to travel in the cam groove 120 formed on the adjacent face of the cam wheel 121. The cam wheel 121 is secured to the main cam shaft 72 by means of key 103. Through this train of mechanism during the rotation of the cam shaft 72, the cup carriage 108 will be reciprocated back and forth making one full journey for each rotation of the cam shaft.

Referring to Figure 28 which diagrammatically represents the contour of cam groove 120, it will be noted that during the first 100 degrees of rotation of the cam, the cup carriage is moved forwardly to carry the fruit cups to the transfer station, for the next 70 degrees while the fruit cups are being released into engagement with the fruit, the cup supporting carriage 108 is maintained stationary and from the 170 degrees position to the 205 degrees position, the cam groove is arranged to advance the carriage slowly while the cups carry the fruit through the bisecting means and from the 205 degrees to the 270 degrees the cups are moved rapidly to carry the fruit to the pitting station, from this point to the end of the operating cycle the carriage will remain stationary.

It is one of the important features of this invention to arrange the cam groove 120 to advance the engaged fruit relatively slowly through the bisecting means and thereafter to advance the fruit rapidly to the pitting station. During the first portion of the operating cycle of the machine, while the fruit is being advanced by the pusher element, the fruit cups 106 are moving from the pitting station to the transfer station, the inter-relation of these two functions may be readily understood from Figs. 28 and 29.

Means are provided for holding the fruit engaging cup 106 in its retracted position during the forward stroke of the carriage and for permitting the fruit cup 106 to move into engagement with the fruit located in the transfer station and to remain in yielding contact with the fruit during the movement of the fruit from the transfer to the pitting stations and for releasing the pitted fruit half and ejecting the same from the cups during the initial portion of the next forward stroke of the carriage. These means are diagrammatically illustrated in Figs. 17, 18, 19 and 20 and are illustrated in other figures of the drawings.

For controlling the fruit cups in the manner described, the plunger 107 is provided with a bracket 122 (Fig. 11) on the lower end of which is journaled a cam roller 123. During the forward movement of the carriage, the cam roller 123 will roll along the cam switch rail 124 (Fig. 19) and due to the shape of this member will retract the fruit cup 106 from engagement with the fruit half and during this initial portion of the operating cycle, the fruit half engaged by the cup will be ejected therefrom by the ejector means 125 including an ejector plate 126 (Fig. 11) mounted upon the forward end of an ejector plunger 127. Connected to the ejector plate 126 is second plunger 128 which extends through the rear portion of the cup and the rear end of which is arranged to engage the carriage 108 when the plunger 107 is moved rearwardly to the position indicated in Fig. 19 to force the ejector plate outwardly and thereby positively eject the fruit half from the cup. This insures an accurate and positive discharge of the bisected and pitted fruit half from the machine. Just before the cup carriage 108 completes the forward end of its journey, the cam roller 123 rides from the end of rail 124 and into engagement with the cup controlling gate 129 (Figs. 17 and 20). The carriage 108 has now completed its forward travel and remains stationary for 70 degrees while the fruit engaging cup 106 is lowered into contact with the fruit located in the transfer station.

The gate 129 is operated at this point to permit the fruit cup 106 to gently move into contact with the fruit under the influence of its spring 109. The means for actuating gate 129 includes connecting the free end of the gate to the lower arm 130 of cam lever 94 by the link means 131. The cam lever 94 is actuated by the pusher actuating cam in the manner previously described. During the return travel of the pusher element 83 that is between the 100 degree and 170 degree positions of the operating cam, the gate 129 is swung about its pivot 132 counterclockwise as viewed in Fig. 17 to gently lower the fruit cup 106 into engagement with fruit located in the transfer station. From the 170 degree position to the 205 degree position, the carriage 108 advances slowly during which time the cup 106 carries the fruit through the bisecting means and then is moved rapidly from the 205 degree to the 270 degree position to advance the bisected fruit half into pitting register. During the return travel of the carriage 108, the cam roller 123 will engage and travel along the cam plate 133 (Figs. 17 and 18) to gradually retract the fruit engaging cup 106 as the fruit is moved along the pitting plate 134 to the pitting station. During this travel, the switch rail 124 will be lifted against the action of its spring means 135 to permit the cam roller 123 to pass its free end, whereupon the next forward travel of the carriage 108 the cam roller 123 will again travel along the switch rail 124. For each operating cycle of the machine, the cam roller 123 first travels during the forward movement of carriage 108 along the switch rail 124 into engagement with the gate 129 and then during the return stroke along the cam plate 133 to its starting position and in between the forward and rearward travel of the carriage, the gate 129 gently releases the fruit cup into engagement with fruit located in the transfer position. Figures 17 to 19 also illustrate the motion of gate 129 during the operating cycle. Figure 19 shows the carriage moving forwardly during the initial portion of the operating cycle and at the same time the gate 129 is rotating about its pivot in a clockwise direction reaching the maximum travel in this direction in Fig. 17 just as the cam roller 123 rides from the end of the rail 124 and while the carriage remains stationary the gate is swung in a counter-clockwise direction permitting the cam roller 123 to travel along its cam surface to control the movement of the fruit engaging cup 106 and finally releasing the cam roller 123. The cup 106 is prevented from engaging the impaling blades 54 and 104 as well as the bisecting means by any suitable form of stop and is retracted so as to clear the pitting plate 134 by the cam plate 133 and in this way the machine may be operated with no fruit in the machine without damage.

The cup carrying carriage for the opposite side of the machine is reciprocated in the manner described that is by securing the double ended lever 94 to the cam lever shaft 93 by suitable key means and to key to another portion of this shaft a lever arm 130a which corresponds to the arm 130 of lever 94.

In this embodiment of the invention, the bisecting means preferably includes a circular saw 136 mounted on mandrel 137 journaled in the frame and driven from the motor by means of a pulley 138 secured to the outer end of the mandrel which is connected by means of belt 139 to pulley 140 journaled on a countershaft 141, and preferably integral with pulley 140 is a second pulley 142 which is driven from the motor pulley 143 by means of belt 144. Bracket 145 is preferably made adjustable for tensioning the saw driving belts. The saw is driven directly from the motor and through the system of pulleys is speeded up so as to travel a relatively high rate of speed to thereby more efficiently act in cutting or bisecting the hard pits of the fruit.

It will be understood that the plane of the saw is coincident with the plane of the impaling blades 54 and 104 whereby fruit impaled on these blades will be correctly alined with the splitting or bisecting saw. It is one of the features of this invention to arrange the saw out of reach of the operator to prevent injury, and it is for this reason that the impaling blade 54 is made of sufficient length to provide a feeding station spaced a safe distance from the saw. In Figure 25 one relation of the circular saw with the lower impaling blade is shown. In actual practice it was found that a saw blade of $\frac{1}{32}$ of an inch thick was quite sufficient, while the width of the adjacent end of the impaling blade is in the neighborhood of $\frac{1}{8}$ of an inch. These dimensions are merely given for the purpose of illustration as other dimensions may be advantageously used. This arrangement however has one important advantage in that, the meat of the fruit engaging the impaling blades is held sufficiently spread to prevent sawdust or pit fragments from being embedded in the fruit meat while the saw is cutting through the hard pit, this is further assisted by terminating the sharpened edges of the impaling blades just before the saw end thereof (note Figs. 3 and 25). To further assist in maintaining the meat of the fruit free of sawdust or pit chips, a stream of water may be directed against each side of the saw just above the portion of the saw blade which enters the fruit, this relation of the water jets 146 is shown in Figure 25. The water or other fluid provided by these jets will be carried by the saw through the fruit and will act as a cushion in preventing sawdust and pit fragments from becoming embedded in the meat portion. Other jets of water, air or other fluid may be directed against the saw blade at other points of its periphery for the purpose of removing foreign material therefrom. In Figure 24 the cleaning jets 146 are shown arranged to flush the teeth of the saw just after they pass through the fruit and attention is directed to the positioning of these jets in that they are spaced one tooth apart in order to more effectively perform their cleaning operation. If preferred, the jets may be spaced a greater number of teeth apart and more jets may be provided. Also it is preferred to jet the cleaning fluid against the saw in angle relation thereto as shown in Figure 25.

Figs. 26 and 27 illustrate a modified form of impaling blade for the purpose of guiding the meat portion of the fruit across the cutting teeth of the saw for preventing sawdust or pit chips from becoming embedded in the meat of the fruit. In this embodiment the saw end of each of the impaling blades 54 and 104 is provided with a groove 147 through which the cutting edge of the saw travels, whereby as the fruit is moved across the saw, the meat of the fruit which lies opposite the impaling blades will be guided across the cutting teeth of the saw and thus protected from injury, the saw acting primarily to cut the hard pit of the fruit and, as in the prior case, water or other means may be provided for carrying away the sawdust and pit fragments.

As most of the sawdust and pit fragments are produced by the teeth of the saw passing through the pit and in those cases where the blade is continuously cleansed, the groove portion 147 of the upper blade 104 may be dispensed with as the saw blade is cleaned during its travel past this portion of the fruit. A shield or casing 148 is provided to shield the saw blades and to collect the cleaning fluid, sawdust and pit fragments for disposal.

Attention is directed to the fact that the bisecting saw is driven directly from the motor and therefore is continuously operated irrespective of whether the operating clutch 57 is engaged or disengaged.

As previously stated, the fruit carrying cups 106 carry the fruit across the saw blade 136 relatively slowly to prevent overloading the saw and exertion of excessive pressure on the fruit. Shortly after the fruit has been bisected, the bisected fruit halves are moved onto the pitting plates 134, one located on each side of the saw blade. The pitting mechanisms for each side of the machine are of identical construction and therefore the description will be limited to one side.

Figure 15:
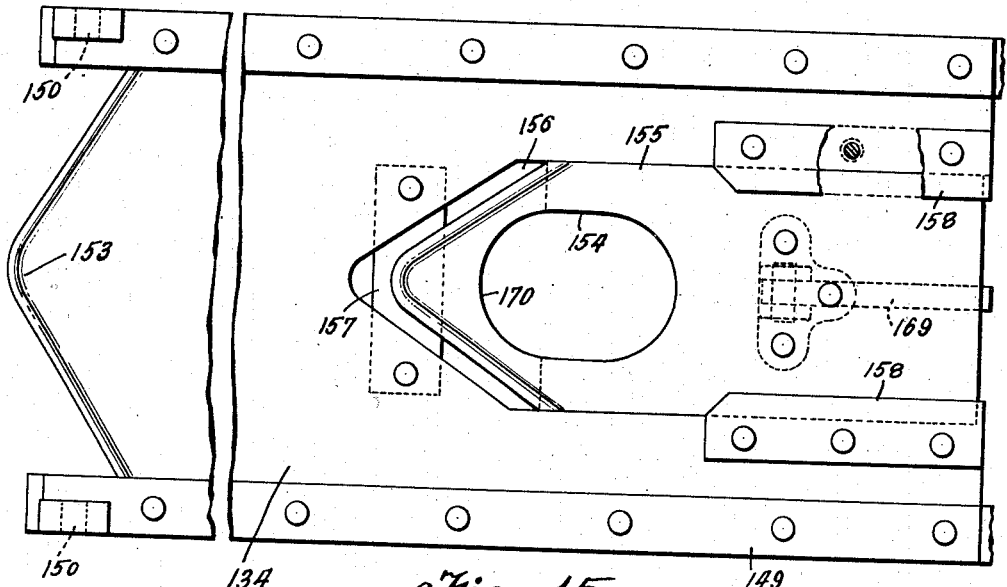
Figure 15 illustrates an enlarged elevational view of the peach supporting pitting plate and the adjustable shear plate.

The pitting plate 134 is mounted upon a swing frame 149 (Figs. 3, 4, 9 and 15), having its forward end pivotally connected to the machine frame as at 150 and connected at its rear end to the frame by spring 151 which normally holds the pitting plate against stop screw 152 (Fig. 4). The purpose is to permit the pitting plate 134 to automatically swing into adjustment for different sizes of peach halves. The forward end of pitting plate 134 is pointed as at 153 and this portion of the plate is beveled as shown in Fig. 4 and is positioned close to the saw blade 136 to facilitate a smooth transfer of the fruit half from the bisecting saw blade to the pitting plate. The portion 153 of the pitting plate also serves the purpose of engaging the pit and through the pit directing the change in the direction of travel of the fruit half, thereby relieving the meat portion of the fruit from strain in making this change. At about the same time the fruit is moved into engagement with the pitting plate 134, the cam roller 123 will engage the cam plate 133 and will direct the fruit carrying cup 106 along an inclined path which will approximate the normal angle of the pitting plate. In this way, the fruit is moved outwardly from the center line of the machine to provide room between the two pitting plates for the pit removing means. The pitting plate is provided at the pitting station with a pitting orifice 154. In the preferred embodiment of the invention, the pitting orifice is formed in an orifice plate 155 slidably mounted within an opening 156 formed in the pitting plate (Figs. 9 and 15) whereby the fruit engaging surface of the two plates lies in the same plane. The forward end of orifice plate 155 is guided by the strap 157 extending across the forward portion of the pitting plate opening 156 while the rear end of the plate is guided by guide plates 158.

Figure 5:
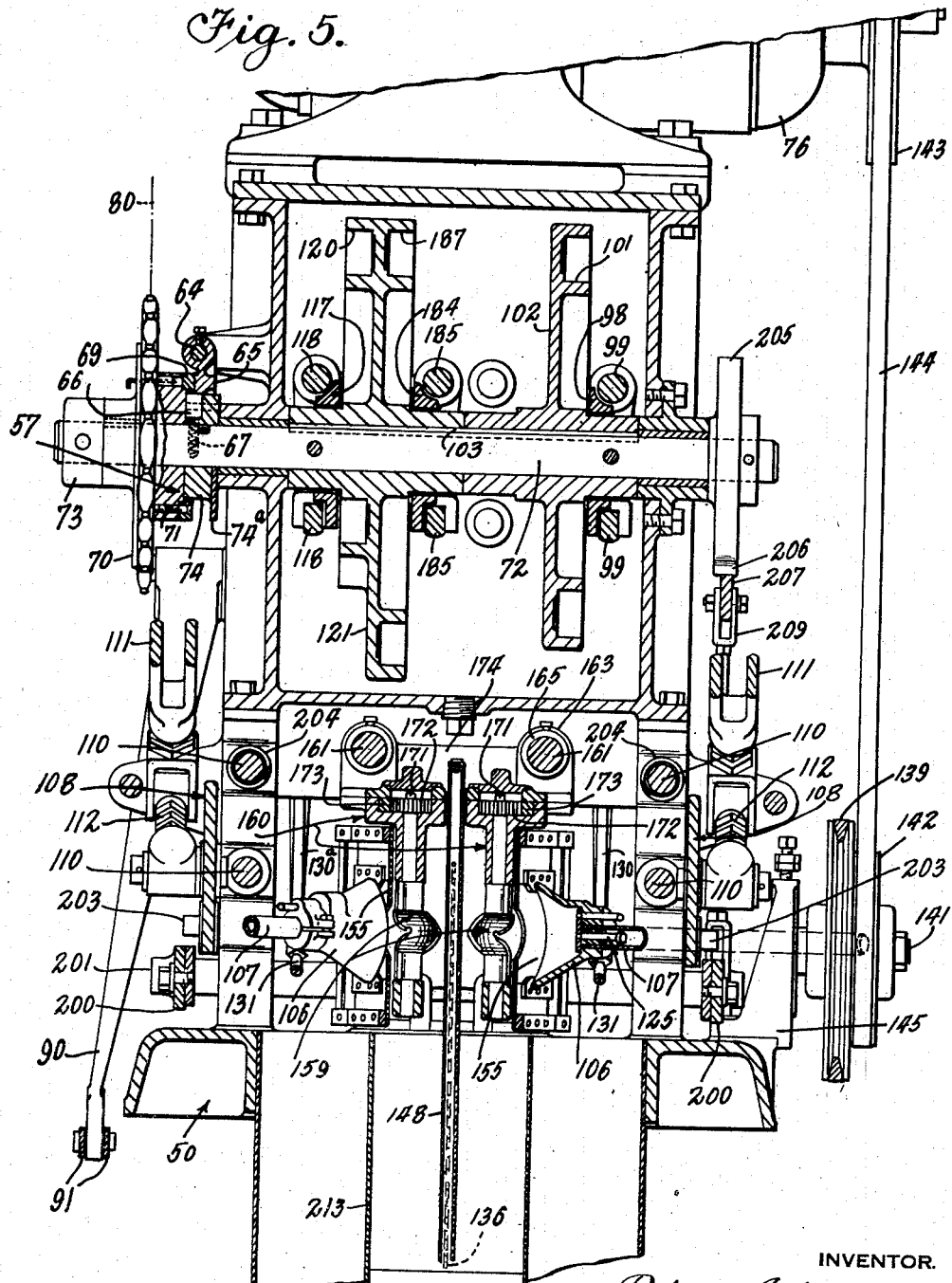
Figure 5 illustrates on enlarged scale a sectional view taken substantially in the plane of line 5—5 of Figure 1.

Positioned directly in back of the pitting plate to operate through the pitting orifice 154 is a pitting knife 159. The pitting knife 159 is carried upon a pitting knife frame 160 slidably mounted on the guide rod 161 (Figs. 3 and 5). As may be observed in Fig. 3, the pitting knife frame 160 is provided with two spaced bearings 162 and 163 for mounting the frame upon the guide rod 161. It should be clearly understood that the pitting knife frame for each side of the machine is completely independent from the other and as a result thereof, each may slide upon its guide rod 161 without effecting the other. The travel of the pitting frame 160 along the guide rod 161 is limited by collars 164 and 165 securely fastened on the guide rod 161 between the pitting frame bearings 162 and 163 (Fig. 3). The pitting frame bearing 162 is yieldingly maintained in contact with collar 164 by spring means 166 acting between this frame bearing and an adjusting collet 167 mounted on the guide rod adjacent the frame portion 168.

In order to prevent the pitting knife from tearing the meat of the fruit during the final portion of the pitting operation, it is essential for the shearing edge 170 of the pitting orifice plate to be maintained in correct shearing relation with the pitting knife for the different adjusted positions of the pitting plate 134. This is accomplished by connecting the orifice plate to the pitting frame by means of link 169 (Figs. 4 and 9). As may b̲e̲ pitting frame 160 is moved ̲ ̲ ̲ ̲ orifice plate will be correspondingly shifted to link 169 to maintain the proper shearing relation with the pitting knife. On the other hand, if a small fruit half is to be pitted, the pitting plate 134 will swing to a greater angle with relation to the center line of the machine and would swing the orifice plate from the pitting knife, but as the pitting plate 134 swings outwardly link 169 which is connected between the orifice plate and the pitting knife frame 160 will correspondingly move the orifice plate to maintain correct shearing relation between the plate and pitting knife. The advantage of this structure will be readily appreciated when it is considered that small fruit halves usually contain relatively small pits and for such fruit the shearing plate 134 will automatically swing away from the pitting knife thereby reducing the depth and length of cut removed from the fruit. On the other hand, when an extremely large fruit half is to be pitted, the pitting plate 134 will swing more closely to the pitting knife 159 permitting the pitting knife to remove a larger cut from the fruit. In other words the size of the fruit automatically determines the size of cut removed from the fruit by the pitting knife. Due to this advantage, it is not necessary to grade the fruit prior to passing the same through the machine as the machine will operate to just as efficiently pit large and small fruits.

The pitting knife is driven in timed relation with the pushing and conveying means by a similar cam. The diagram of the pitting knife cam is illustrated in Fig. 30 and therein showing the pitting knife remaining stationary for 260 degrees, and thereafter to the 327 degree point driving the knife through a pitting cut and then after a short dwell of 3 degrees, returning the knife to its normal position.

By comparing the three diagrams, Figs. 28, 29 and 30, the time of operation of the several instrumentalities of the machine may be readily compared.

Figure 16:
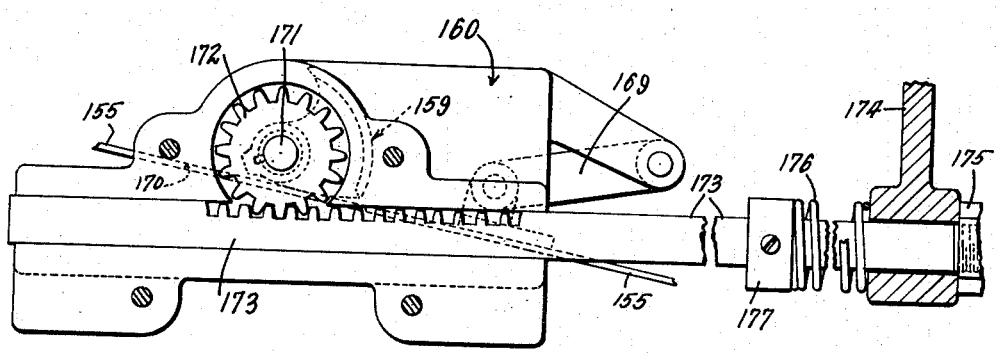
Figure 16 illustrates an enlarged sectional view taken substantially in the plane of line 16—16 of Figure 3.

The driving means for the pitting knife includes mounting upon the upper end of the pitting knife shaft 171 (Figs. 5 and 16) a spur gear 172 meshing with the rack teeth formed on one edge of the rack rod 173 slidably mounted in the pitting knife frame 160. The rack rod 173 extends rearwardly (Fig. 3) having its rear end portion slidably extending through cross head 174 and is provided with lock nuts 175 for adjustably positioning the rod with relation to the cross head in one direction. A spring 176 is mounted on rod 173 and acts between the forward face of the cross head and collar 177 fastened to the rod, thus providing a yieldable driving connection between the cross head and rack rod during the forward movement of the cross head, whereby should the pitting knife become lodged or hang up on a broken pit, or for any other reason, the driving means will yield to prevent breakage of the knife. The collar 177 is adjustably mounted upon the rack rod to provide adjustment for spring 176. The cross head is slidably mounted on the end of guide rod 161 (Fig. 3) and is connected to cam lever 178 by link 179, the cam lever 178 is journaled upon the lever shaft 93 between collars 180 and 181. The upper end of lever 178 is connected to plunger 182 by links 183 (Fig. 7) while the forward end of the plunger is connected to cross head 184 slidably mounted upon spaced guide rods 185. The cross head is provided with a cam roller 186 arranged to travel in the cam groove 187 formed on the adjacent face of cam wheel 121. The cam wheel 121 is keyed upon the main cam shaft 72. With the releasing of clutch 57, the cam wheel will make one complete revolution and will drive the cross head 184 to in turn, through the mechanism described, drive the two pitting knives independently.

The drive for both pitting knives is the same from their operating cam to cross head 174 and from this point the drive for each is through the respective springs 176 thereby providing a driving means which will permit one or the other of the pitting knives to hang up or stop during the pitting operation without effecting the operation of the other. During the return stroke of the cross head, the pitting knives are positively returned to their rest positions by the engagement of the cross head with the adjusting nuts 175. It will be noted that each of the pitting knife driving means includes a yielding means for actuating the pitting knife through its pitting operation, but is positively returned to its rest position, in other words should one of the pitting knives hang up and rotate only partially through a piece of fruit, the driving spring will yield to permit the knife to remain stationary during the remainder of the pitting cycle but the knife will be positively withdrawn from the fruit and returned to its rest position when the cross head engages the lock nuts 175. This form of driving means for the pitting knives has proven very satisfactory in actual operation and has reduced breakage of the pitting knives to a minimum.

Some peaches have exceptionally long pits and in order to cleanly remove them from the fruit half, the pitting frame is provided with limited longitudinal movement with relation to the fruit half clamped on the pitting plate. When pitting a peach having an unusually long pit, the pitting knife will engage the rounded back portion of the pit and as it cannot cut through the pit will follow the contour of the pit which will necessitate a bodily movement of the knife during the pitting operation. To provide for this movement of the pitting knife, the pitting frame 160 is slidably mounted upon the guide rod 161 in the manner described and is resisted in such movement by spring 166. The spring 166 will yield prior to yielding of the driving spring 176 thereby permitting the pitting knife to follow the contour of the pit. The shearing edge 170 of the orifice plate will follow the movement of the knife because of the connection formed between the pitting knife frame and orifice plate provided by link 169.

Because of this arrangement, the pitting knife is enabled to remove exceptionally long pits from the fruit without making a proportionately deep cut into the fruit which would be necessary in case the pitting knife was limited to rotation only about its normal axis, in which case a larger knife would have to be used to remove long pits resulting in considerable wastage. It also permits the treating of unassorted fruits with a relatively small knife which will economically remove small size pits from the smaller fruit as well as to remove long or large pits from other fruit.

It will be understood that any of the usual forms of pitting knives may be used in this machine, however, I prefer to provide a pitting knife of the type shown in Fig. 22, which has many advantages a number of which will be set forth.

This form of knife is inherently strong and is not readily subject to breakage, is inexpensive of manufacture and produces a clean cut through the fruit.

A further feature of this knife resides in the shape and arrangement of the cutting edges. As will be noted in Fig. 22, the pitting knife 159 includes a spheroidal body portion 188 having opposed arcuate rearwardly directed converging cutting edges 189 and 190 arranged to start the cutting action at the sides of the knife and progressing the cut as the knife rotates to the center portion where the two cutting edges meet. The advantage in this arrangement resides in the compacting force exerted upon the fruit pit during the pitting operation and whereby cracked or broken pits will be held together and cleanly cut from the fruit half. A pitting knife of this type arranged with floating action has made it possible to successfully and cleanly pit an extremely high percentage of split peaches.

Referring again to Fig. 22, it will be noted that the cutting edges 189 and 190 do not meet in a V but instead there is provided a relatively small opening 191 into which both of the cutting edges terminate. The cutting edge 189 is substantially tangent to one portion of the opening, while the cutting edge 190 terminates abruptly into said opening.

Due to this construction the cutting edge 189 may be extended well into the opening to overlap the end of cutting edge 190 thereby continuing or picking up the cutting action where the cutting edge 190 leaves off, thus making a clean cut through the fruit and providing a knife having cutting edges which are easier to sharpen than would be the case should the two cutting edges terminate in a V, however, the termination of the two cutting edges in a V may be used if preferred, without in any way affecting the other operating features of this knife and likewise the spheroidal body portion of the knife may be reduced materially in size, but it is preferred to use the more extensive body portion to give strength to the knife structure.

Figure 10:
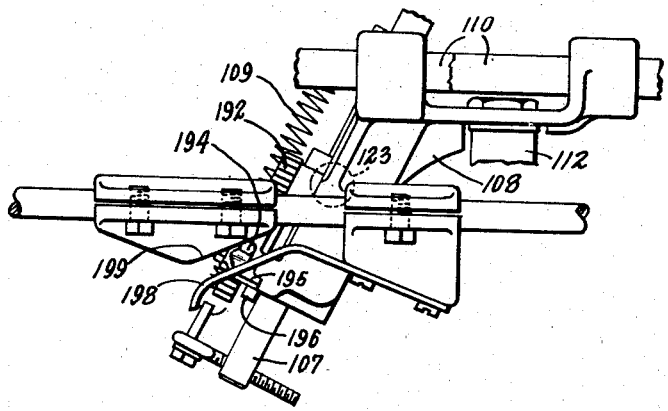
Figure 10 is an elevational view showing the cup carrier latch and latch actuating cam.
Figure 12:
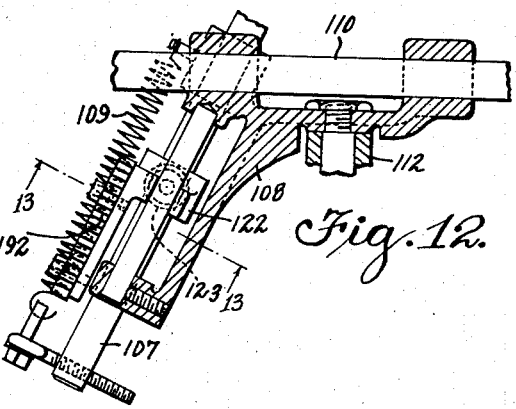
Figure 12 is a sectional view taken substantially in the plane of line 12—12 of Figure 11.
Figure 13:
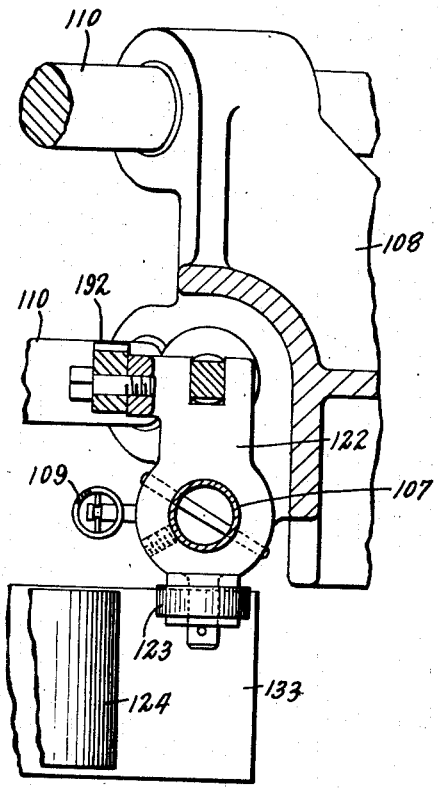
Figure 13 is a sectional view taken substantially in the plane of line 13—13 of Figure 12.
Figure 14:
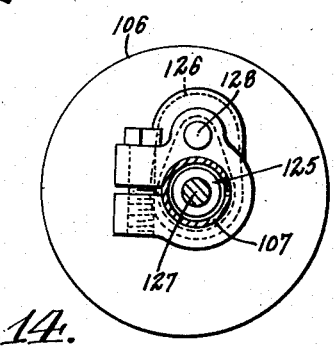
Figure 14 is a sectional view taken substantially in the plane of line 14—14 of Figure 11.

During the pitting operation, the fruit half held in pitting register by the cup 106 might be forced outwardly from the pitting plate if the cup 106 was not locked in its adjusted position during the pitting operation. The locking means provided for this purpose includes a ratchet bar 192 mounted upon the upper end of plunger bracket 122 (Figs. 9, 11, 12, and 13) and cooperating therewith is a locking pawl 193 pivotally mounted upon the conveyor carriage 108. The pawl 193 is provided with an upstanding arm 194 arranged to be engaged by a pair of control cams. The pawl is also provided with a rearwardly extending portion 195 for cooperating with a stop lug 196 formed on the carriage 108 when the pawl is rotated in a clockwise direction as viewed in Fig. 11 to disengage the ratchet bar 192. An overcenter spring 197 is provided to yieldingly maintain the pawl in either of its two positions. During the travel of the carriage 108 to convey the fruit to the pitting station, the upstanding arm 194 will engage cam rail 198 (Figs. 10 and 11) whereby the pawl will be rotated in a counterclockwise direction as viewed in Fig. 11 to engage the rack bar 192 thereby locking the fruit engaging cup 106. The fruit cup will remain locked during the stay of the carriage in the pitting station but will be unlocked as the carriage moves forwardly during the initial portion of the next operating cycle and will remain unlocked until the carriage again returns to the pitting station. The means for releasing or unlocking the cup 106 includes a cam block 199 positioned to engage the upstanding finger 194 during the forward travel of the carriage from the pitting position to swing the pawl in a clockwise direction as viewed in Fig. 11 until the overcenter spring passed its center position whereupon the spring will act to continue the rotation of the pawl until portion 195 engages the stop lug 196, the pawl will thus be held by the overcenter spring in its retracted position during the remaining portion of the forward travel of the carriage and during the return travel of the carriage until the finger 194 again rides along the cam surface 198, whereupon the pawl will be returned into engagement with the rack bar 192.

Figure 6:
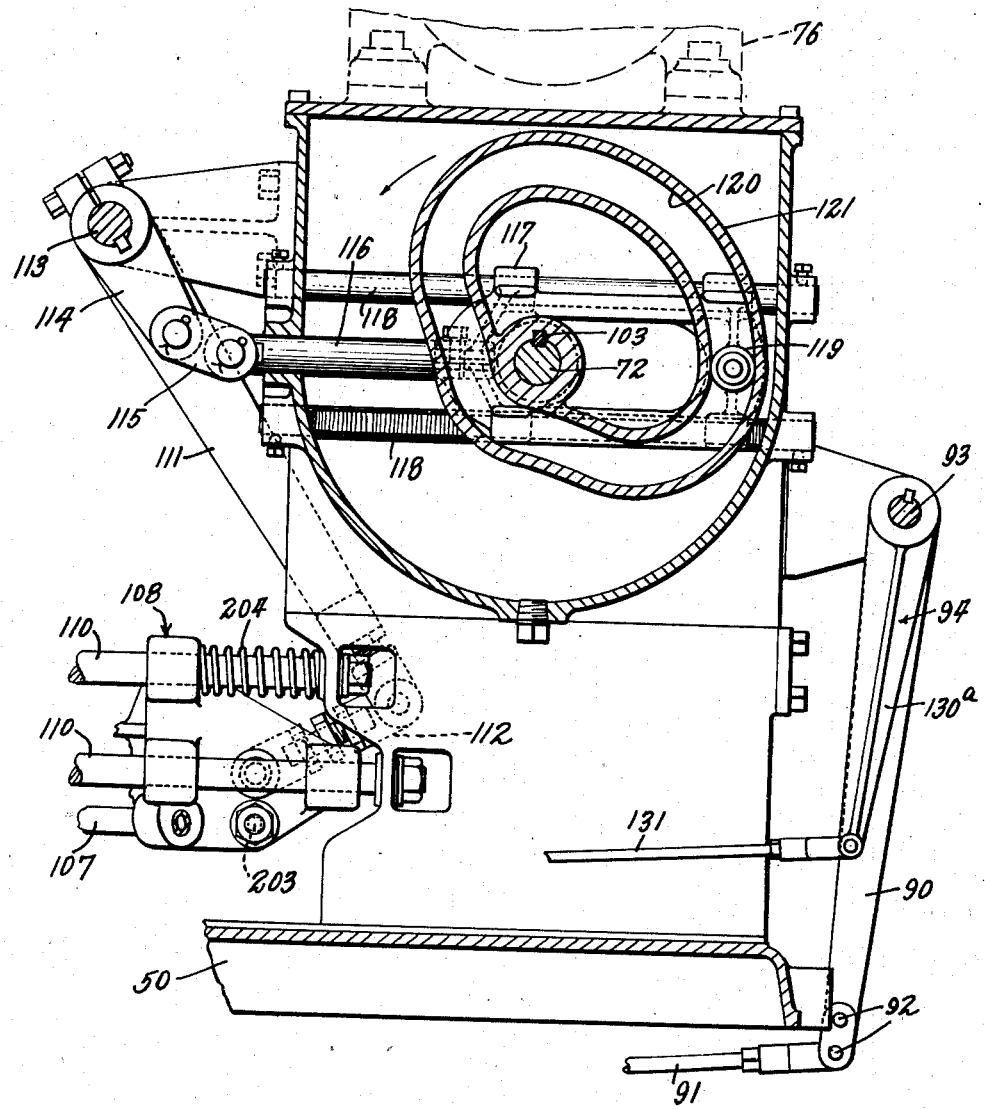
Figure 6 illustrates a sectional view taken substantially in the plane of line 6—6 of Figure 2.

Means are also provided for locking the carriage 108 at the pitting station to insure a correct pitting register of the fruit. The carriage locking means includes latching bars 200 located on each side of the machine, the rear end of the latching bars are fastened to a transverse shaft 201 whereby the two bars are actuated in unison. Adjustably mounted upon the forward end of each of the locking bars is a latch tooth 202 (Figs. 1 and 4). While each carriage 108 is provided with a square latching bolt 203 (Figs. 1, 5, and 6) arranged to ride over the tapered forward end of the latch tooth, depressing the latch bar until the latch bolt 203 passes the tooth, whereupon the forward end of the latch bar will swing upwardly locking the carriage against forward movement. This latching action takes place at the end of the rearward travel of the carriage and latches the carriage in correct pitting register. To maintain the carriage bolt 203 in yielding contact with the rear face of latch tooth 202, the upper guide rod 110 is provided with a spring 204 which is engaged by the carriage and slightly compressed during the final portion of the rearward movement of the carriage while moving the fruit into pitting register. The spring will yieldingly maintain the carriage bolt 203 in locking engagement with the latch bar tooth 202, thus correctly registering the fruit for the pitting operation.

Means are provided for swinging the latch bar downwardly to release the carriage just prior to the completion of the operating cycle of the machine and for this purpose a releasing cam 205 is mounted upon one end of cam shaft 72 and is rotated to turn its lift portion 206 into engagement with lever arm 207 pivotally mounted at 208 to the frame. The lever arm 207 is connected to one of the latch bars 200 by link 209 whereby as the lever 207 is forced downwardly by the lift portion of the cam, the downward movement of the lever is transmitted to one of the latch bars 200 to swing the bar for releasing the carriage.

It will be understood that the operation of one of the latch bars will actuate the other as both are connected to the same shaft. Shortly after the machine is placed in operation for the next operating cycle, the lift portion 206 of cam 205 will ride clear of lever 207 permitting the lever to be swung upwardly by means of spring 210 (Fig. 1) until the forward end of the lever engages the overlying stop bracket 211 (Fig. 1). The upward motion of lever 207 will be transmitted through links 209 to again return the latch bars 200 into latching position. The latch bar will be swung upwardly until the forward end of lever 207 engages its stop 211. The upward movement of lever 207 is not sufficient to permit this lever to engage the lower portion of cam 205, the only time during which the cam and lever are in engagement is when the lift portion 206 thereof turns into contact with the lever. Spring 210 permits the latch bars 200 to be momentarily swung downwardly as the carriage moves into the pitting station and immediately returns the latch bar into locking position as soon as the carriage bolt 203 has passed beyond the latching tooth 202. By the conveyor carriage latching means the fruit is brought into correct pitting register irrespective of such lost motion which may develop in the carriage reciprocating mechanism.

After the pitting operation, the driving clutch 57 is automatically released and the machine brought to rest, upon the feeding of additional fruit and the placing of the machine in operation, the pitted fruit halves are ejected from the holding cups in the manner described during the forward travel of the conveyor carriage 108 and discharged from the machine through the discharge chutes 212, while the pits are discharged through the chute 213, thus separating the treated fruit from the pits. As the pits are discharged at the pitting station and the fruit discharged during the travel of the conveyor carriage 108, it is an easy matter to separate the fruit halves from the pits. The machine will now continue upon its second cycle of operation repeating the steps as previously described.

In the drawings the axes of the fruit engaging cup plungers 107 are shown having an angular relation to the longitudinal axis of the machine and consequently to the fruit impaling blades 54 and 104 and to a lesser degree with the pitting plate 134.

It has been found in practice that an angle of 26 degrees is most advantageous, however, any other suitable angle may be used which will serve the purpose of locating the forward edge of large and small fruit in substantially the same position, this is shown in Fig. 31. The angular arrangement of the axes of the fruit cup supporting plungers 107 serves a further purpose which is to more advantageously apply the conveying force to the fruit whereby the fruit may be conveyed with less pressure.

Having fully described my invention it is to be understood that I do not wish to be limited to the type herein set forth as my invention is to have the full scope of the appended claims.

I claim:

1. In a fruit treating machine, an impaling blade for supporting fruit to be treated, and fruit engaging means movable into engagement with the fruit along an axis obliquely related to the plane of said blade for positioning a selected portion of each piece of fruit whether relatively large or small at a predetermined location.

2. In a fruit treating machine, an impaling blade along which fruit under treatment is conveyed, fruit engaging means movable into engagement with the fruit along an axis obliquely related to the plane of said blade for positioning a selected portion of each piece of fruit whether relatively large or small at a predetermined location, and means for advancing said fruit engaging means to in turn convey the engaged fruit along said blade to a treating station.

3. In a fruit treating machine, an impaling blade along which fruit under treatment is conveyed, fruit engaging means movable into engagement with the fruit along an axis obliquely related to the plane of said blade for positioning a selected portion of each piece of fruit whether relatively large or small at a predetermined location, fruit pitting means associated with said blade and means for advancing said fruit engaging means for conveying the engaged fruit into pitting register with said pitting means.

4. In a fruit treating machine, an impaling blade along which fruit under treatment is conveyed, fruit pitting means associated with said blade and operable for removing the pits from fruit presented thereto, fruit engaging means moved into engagement with the fruit along an axis obliquely related to the plane of said blade, and means for advancing the fruit engaging means to convey the engaged fruit along said blade to the pitting means, said fruit engaging means acting due to its said angular relation to position the pit of each piece of fruit whether relatively large or small in predetermined pitting register with said pitting means.

5. In a fruit treating machine, a blade for supporting a fruit half, a pitting means associated therewith, and a fruit engaging means moved into engagement with the fruit along an axis obliquely related to the plane of said blade and thereafter moved to advance the fruit half along said blade to the pitting means, said fruit engaging means acting due to its said angular relation to position the pit of each fruit half whether relatively large or small in substantially the same predetermined pitting register with said pitting means.

6. In a fruit treating machine, a blade for supporting a fruit half, a pitting means associated therewith, and a fruit engaging means moved into engagement with the fruit along an axis obliquely related to the plane of said blade for holding said fruit during the pitting operation, said fruit engaging means acting due to its said angular relation to position the pit of each fruit half whether relatively large or small in substantially the same predetermined pitting register with said pitting means.

7. In a fruit treating machine a floating pitting plate having a pitting orifice, a pitting knife arranged to act through said orifice, a shear plate slidably mounted upon said plate, and means operable upon movement of said plate to accommodate fruit halves of different sizes for moving said shear plate relative to said floating plate to maintain said shear plate and pitting knife in shearing relation.

8. In a fruit treating machine a floating pitting plate having a pitting orifice, means movable relative to said plate including a pitting knife arranged to act through said orifice, a shear plate slidably mounted upon said floating plate and having a shearing edge, and means interconnecting said movable means and said shear plate for maintaining the shearing edge of said shear plate and said pitting knife in shearing relation independently of the relative movements between said floating plate and said movable means.

9. In a fruit treating machine a pitting plate having a pitting orifice, means movable relative to said plate including a pitting knife arranged to act through said orifice, a shear plate slidably mounted upon said pitting plate and having a shearing edge, and means interconnecting said movable means and said shear plate for maintaining the shearing edge of said shear plate in close shearing position for said pitting knife independently of the movement of said movable means.

10. In a fruit treating machine a pitting plate having a pitting orifice, a shear plate forming one portion of said orifice and movable relative thereto, pitting means for said plate operable through said orifice and cooperating in shearing relation with said shear plate, means mounting said pitting means for limited movement relative to said pitting plate, means yieldingly resisting said limited movement of said pitting means, and means for proportionately moving said shear plate with the movement of said pitting means for maintaining the shearing edge thereof in correct shearing position.

11. In a fruit treating machine a pitting plate having a pitting orifice, a shear plate forming one portion of said orifice and movable relative thereto, pitting means for said plate operable through said orifice and cooperating in shearing relation with said shear plate, means mounting said pitting means for limited movement relative to said pitting plate, means yieldingly resisting said limited movement of said pitting means, means for proportionately moving said shear plate with the movement of said pitting means for maintaining the shearing edge thereof in correct shearing position, and yieldable means for driving said pitting means through a pitting operation.

12. In a fruit treating machine a pitting plate having a pitting orifice, a shear plate forming one portion of said orifice and movable relative thereto, pitting means for said plate operable through said orifice and cooperating in shearing relation with said shear plate, means mounting said pitting means for limited movement relative to said pitting plate, means yieldingly resisting said limited movement of said pitting means, means for proportionately moving said shear plate with the movement of said pitting means for maintaining the shearing edge thereof in correct shearing position, and means for driving said pitting means through a pitting operation.

13. In a fruit pitting machine, a curved fruit pitting knife, the blade portion of which includes a cutting edge extending inwardly away from the direction of rotation of the pitting knife to form substantially a V, and wherein the cutting edge extends along the cutting edges of the V with the V-shaped portion disposed substantially at right-angles with respect to the axis of rotation of the knife and so that as the said blade is rotated, the uncut portion of the flesh of the fruit in advance of said knife is progressively narrowed to substantially a point on emergence of the pitting knife from the flesh of the fruit so as to reduce to a minimum the tendency of said blade to tear the flesh of the fruit upon emergence therefrom, and means for rotating the pitting knife.

14. In a fruit pitting machine, a curved pitting knife, the cutting portion of which is of substantially the shape of a segment of a spheroid, means for rotating the pitting knife through the flesh of a fruit to cut a pit cavity therein, the cutting portion of said pitting knife including a cutting edge and a portion of the pitting knife which is advanced through the flesh of the fruit during the rotation thereof, and which provides at substantially the center of said cutting portion a substantial V, the V being disposed substantially at right-angles with respect to the axis of rotation and the widest portion of which is at the advanced point of the cutting edge and which tapers to substantially a point in the blade, and wherein the cutting edge extends along the diverging edges of the V to substantially a point at the apex thereof so that the flesh of the fruit is progressively cut during the rotation of the knife to a very small area at the point of emergence of the pitting knife from the flesh of the fruit so that on emergence a minimum of fruit flesh remains uncut to the tendency of the knife to tear the fruit.

15. A rotary fruit pitting knife having a body which is substantially a spheroidal segment having a cutting edge including opposed arcuate converging cutting edges converging rearwardly of the direction of rotation of the pitting knife, said cutting edge extending along the converging sides to the point of convergence located substantially centrally of the spheroidal segment, the point of convergence of the cutting edges being substantially at right-angles to the axis of rotation of the knife, whereby the knife as it is advanced through the fruit acts along the said converging cutting edges to compact the flesh of the fruit to the said point of convergence, and whereby the tendency of said knife upon emergence from the flesh of the fruit to tear the flesh of the fruit is reduced to a minimum.

PERCY JEPSON.